United States Patent
Li et al.

(10) Patent No.: US 7,623,603 B2
(45) Date of Patent: Nov. 24, 2009

(54) INTERSYMBOL INTERFERENCE MITIGATION

(75) Inventors: Qinghua Li, Sunnyvale, CA (US); Guangjie Li, Beijing (CN); Shanshan Zheng, Beijing (CN); Minnie Ho, Los Altos, CA (US); Xiaoyun May Wu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 617 days.

(21) Appl. No.: 11/539,535

(22) Filed: Oct. 6, 2006

(65) Prior Publication Data

US 2008/0084938 A1    Apr. 10, 2008

(51) Int. Cl.
*H04L 1/00* (2006.01)

(52) U.S. Cl. ......................... 375/348; 375/144; 375/148

(58) Field of Classification Search ................ 375/144, 375/148, 260, 285, 347–349; 455/63.1, 65, 455/67.11

See application file for complete search history.

(56) References Cited

U.S. PATENT DOCUMENTS

| 6,141,393 A | 10/2000 | Thomas et al. |
|---|---|---|
| 6,314,147 B1 | 11/2001 | Liang et al. |
| 6,442,130 B1 | 8/2002 | Jones, IV et al. |
| 7,492,815 B2 * | 2/2009 | Guo et al. .................. 375/229 |
| 2006/0029149 A1 * | 2/2006 | Kim et al. |
| 2006/0256843 A1 * | 11/2006 | Grant et al. |
| 2008/0117997 A1 * | 5/2008 | Maltsev et al. |

FOREIGN PATENT DOCUMENTS

WO    WO 01/93439 A1    12/2001

* cited by examiner

*Primary Examiner*—Dac V Ha
(74) *Attorney, Agent, or Firm*—Schwabe, Williamson & Wyatt, P.C.

(57) ABSTRACT

Embodiments of the present invention provide for computing spatial covariances of intersymbol interference (ISI) and using the computed spatial covariances for ISI mitigation. Other embodiments may be described and claimed.

23 Claims, 3 Drawing Sheets

INTERSYMBOL INTERFERENCE MITIGATION

FIELD

Embodiments of the present invention relate to the field of wireless networks, and more particularly, to mitigating intersymbol interference in transmissions within such networks.

BACKGROUND

Two consecutively transmitted symbols may experience different propagation routes, and therefore different time in transit, between nodes of a wireless network. This may be referred to as channel delay spread. When these symbols overlap at a receiving node, a portion of the received signal may include intersymbol interference (ISI).

Cyclic prefix is employed in orthogonal frequency division multiplexing (OFDM) systems to mitigate the effects of ISI. Since it adds overhead and reduces system throughput, its duration is minimized. When a cyclic prefix is shorter than the maximum delay, ISI may occur across symbols. This happens when the short cyclic prefix is used in typical urban environments, where the short CP is 4.6875 microseconds (µs) and the maximum delay is 5 µs. The ISI is usually caused by the last multipath returns, which have a power 10 decibels (dB) down from the peak return. Although the average signal to interference power ratio (SIR) is about 22 dB on each subcarrier, the effect of ISI is not negligible. When ISI is ignored, the link adaptation predicts a high throughput of the link and selects a high level modulation and code rate. However, the ISI may result in decoding error and the throughput may start to degrade.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the present invention, the phrase "A/B" means A or B. For the purposes of the present invention, the phrase "A and/or B" means "(A), (B), or (A and B)." For the purposes of the present invention, the phrase "A, B, and/or C" means "(A), (B), (C), (A and B), (A and C), (B and C), or (A, B and C)." For the purposes of the present invention, the phrase "(A)B" means "(B) or (AB)," that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention provide for intersymbol interference mitigation in communication between nodes of a wireless network.

Figure 1:
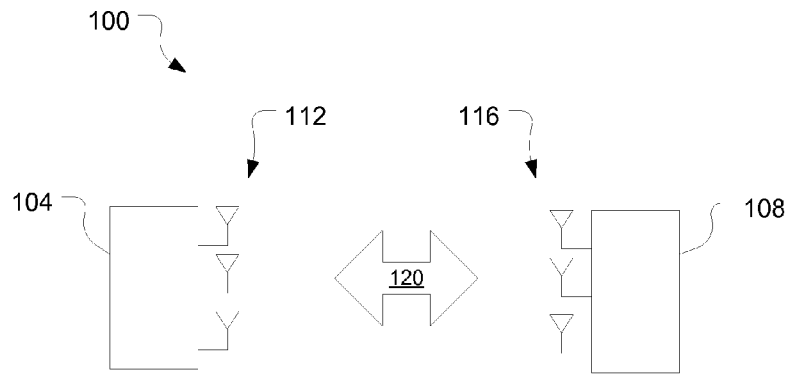
FIG. 1 illustrates a communication system in accordance with various embodiments of the present invention.

FIG. 1 illustrates a communication system 100 in accordance with an embodiment of this invention. In this embodiment, two wireless nodes are shown, e.g., a transmitter 104 and a receiver 108. Each of the wireless nodes may have multiple antennas, e.g., three transmit antennas 112 and three receive antennas 116, to provide their respective nodes with a wireless interface to an over-the-air (OTA) communication link (OTA link) 120 communicatively coupling the two nodes. A node having multiple transmit and receive antennas may be referred to as a multiple-input, multiple-output (MIMO) node. In various embodiments, a node may include any number of transmit and/or receive antennas.

The transmitter 104 of the communication system 100 may map a sequence of data into a number of symbols using a modulation constellation (e.g., QAM, PSK, etc.). The transmitter 104 may then transmit the symbols as a modulated signal using a modulation technique, e.g., orthogonal frequency division multiplexing (OFDM), that divides a spatial channel of the OTA link 120 into a number of subcarriers. Data streams transmitted on adjacent subcarriers may be orthogonal to one another to reduce interference.

The multiple transmit antennas 112 shown in FIG. 1 may be used to form one or more active spatial channels. One spatial channel may be formed by one or more of the transmit antennas 112. More than one transmit antenna 112 may form a single spatial channel through the utilization of beamforming weights. The signal model of a signal received by the receiver 108 may be $$y(f) = H(f) \times (f) + v(f) + n(f) \qquad [\text{EQ. 1}]$$

where H(f) is a channel matrix (e.g., with or without beamforming and/or space-time coding) on subcarrier f; f is the subcarrier index, x(f) is the transmitted signal vector; n(f) is the AWGN noise vector; and v(f) is the interference vector. The interference may be due to ISI and/or other sources. The entries of n(f) vector may be independent identically distributed while those of v(f) may not.

Figure 2:
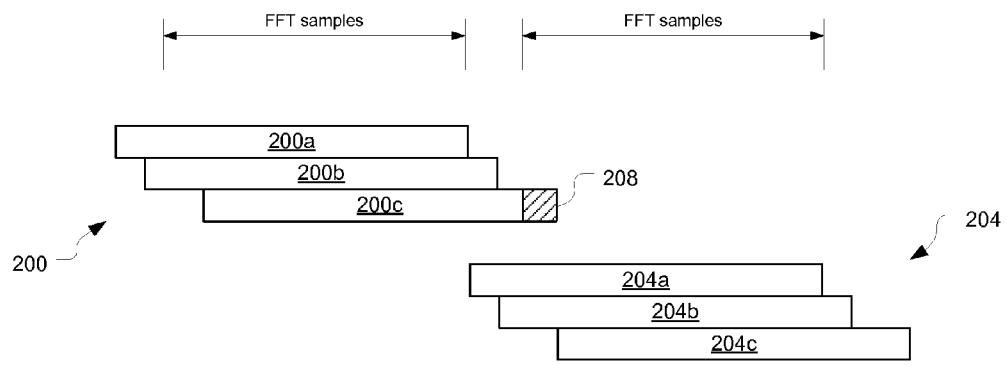
FIG. 2 illustrates symbols transmitted in a communication system resulting in ISI in accordance with various embodiments of the present invention.

FIG. 2 illustrates a transmission of two symbols in accordance with various embodiments of this invention. This embodiment illustrates a first symbol 200 and a second symbol 204. The receiver 108 may receive each of the symbols 200 and 204 as multiple signals, 200a-200c and 204a-204c, superpositioned over one another. These signals may arrive at the receiver 108 at different times due to different propagation paths. The receiver 108 may take fast Fourier transform (FFT) samples of the two symbols 200 and 204 as shown. A portion 208 of the signal 200c may cause ISI with the sampling of the second symbol 204.

Figure 3:
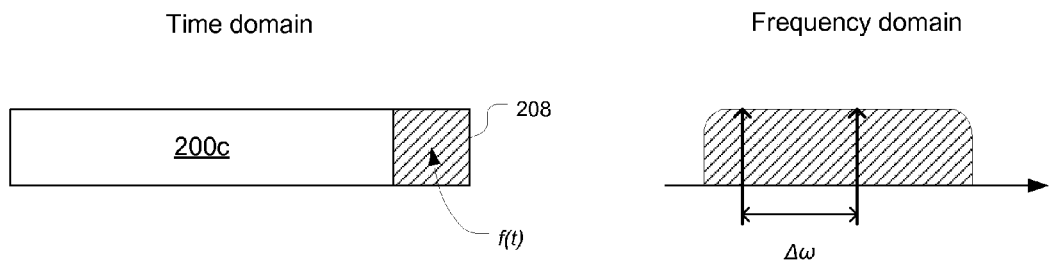
FIG. 3 illustrates an ISI portion in time and frequency domains in accordance with various embodiments of the present invention.

FIG. 3 illustrates ISI in the time and frequency domain in accordance with various embodiments of this invention. The ISI signal in the time domain, portion 208, may be represented by f(t). In the frequency domain, the correlation between two subcarriers spaced $\Delta\omega$ apart may be computed as $$r(\Delta\omega) = IFFT(\|f(t)\|^2).\qquad [EQ.\ 2]$$

Since f(t) has a narrow span in time, usually less than 0.5 μs, the width of $r(\Delta\omega)$ may be relatively wide in frequency, e.g., 14 MHz bandwidth. For example, if f(t) has only one sample, $r(\Delta\omega)$'s magnitude may be flat in frequency. The wideness of $r(\Delta\omega)$'s main lobe may indicate that the frequency response of f(t) may be highly correlated. This can be viewed from another point. The ISI signal f(t) has a limited number of random variables from a few samples. The frequency response has a greater number of points generated from the few random variables of f(t) by Fourier transform. Therefore, the frequency responses on the subcarriers may be highly correlated. Because of this high correlation, the ISI may be approximated as frequency flat. Namely, the ISI power level may be approximately the same across frequency, and the subcarrier responses may be correlated.

In some embodiments, if v(f) is highly correlated across subcarriers, then it may be estimated by pilot symbols, which are distributed across subcarriers and interleaved with data symbols, and subtracted from the received signal in EQ. 1 for the decoding of the desired signal.

The high correlation of the frequency responses on the subcarriers may enable a low complexity estimation of spatial covariance values of ISI over the subcarriers. A spatial covariance value may be a measurement of how much ISI is correlated across antennas or spatial channels. For example, a high covariance value suggests that if one of the antenna responses is above its expected value, the other response will also most likely be above its expected value. These spatial covariance values may be arranged in a covariance matrix. These spatial covariance values may be computed by the receiver 108 and used for ISI mitigation on received signals.

Figure 4:
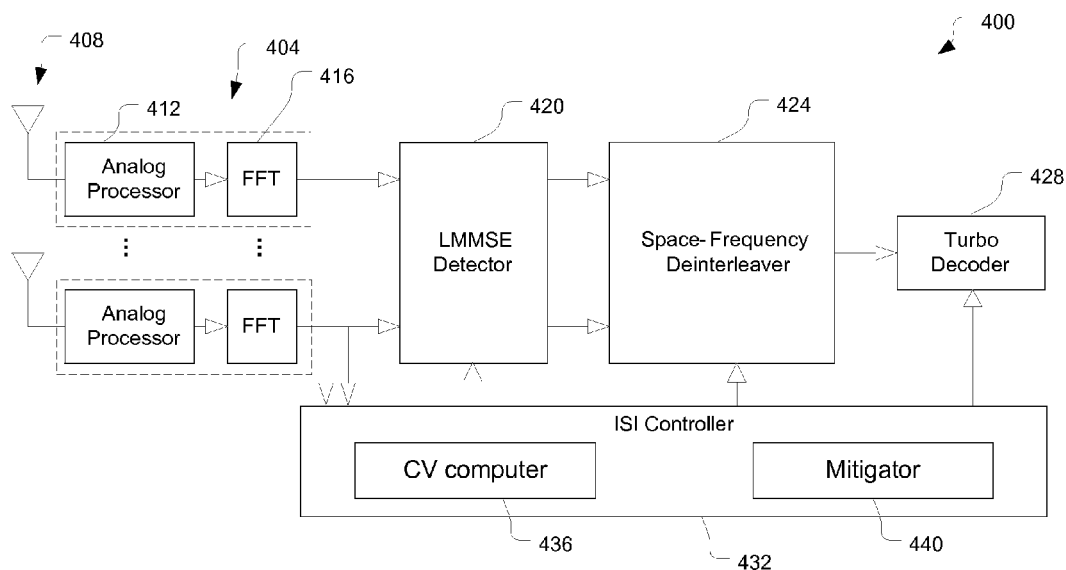
FIG. 4 illustrates a multiple-input receiver in accordance with various embodiments of the present invention.

FIG. 4 illustrates a receiver 400 that may be similar to, and substantially interchangeable with, receiver 108 in accordance with various embodiments of the present invention. In this embodiment, the receiver 400 may include a receive chain 404 corresponding to each of its receive antennas 408. Each receive chain 404 may include components for analog processing 412 and/or FFT 416 of a received signal. The receiver 400 may have a linear minimum mean squared error (LMMSE) detector 420 coupled to the receive chains 404 for initial error detection computations. The LMMSE detector 420 may couple the received signal(s) to a space—frequency deinterleaver 424 to unpack interleaved transmissions. The receiver 400 may also have a turbo decoder 428. The turbo decoder 428 may decode the encoded transmission taking into account likelihood data introduced by a complementary front—end turbo encoder of a corresponding transmitter, e.g., transmitter 104.

The receiver 400 may also include an ISI mitigator 432. The ISI mitigator 432 may be coupled to each of the receive chains 404, the LMMSE detector 420, the deinterleaver 424, and the decoder 428 as shown. The ISI controller 432 may include a covariance computer 436 to receive signals from the receive chains 404 and to compute spatial covariance values based on the received signals. The ISI controller 432 may also include a mitigator 440 to control operations of the LMMSE detector 420, the deinterleaver 424, and/or the decoder 428 in a manner to mitigate ISI in received signals.

Figure 5:
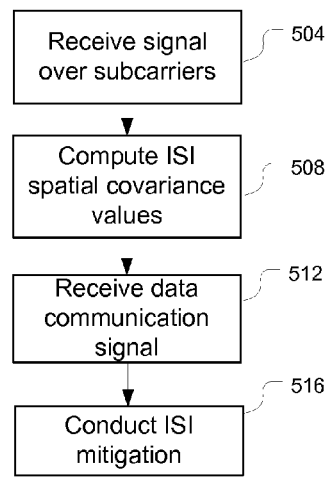
FIG. 5 illustrates an ISI mitigation operation in accordance with various embodiments of the present invention.

FIG. 5 illustrates an ISI mitigation operation of an ISI controller, e.g., the ISI controller 432, in accordance with various embodiments of the present invention. The receiver 400 may receive a signal, e.g., a training signal including one or more training symbols, over a plurality of subcarriers via the OTA link 120, block 504. A training symbol may be a symbol that is known to the receiver 400. These symbols may be preamble symbols, pilot symbols, etc.

The covariance computer 436 may receive the training signal, post-processing by the receiver chain 404, and compute spatial covariance values of ISI based on the received training signal, block 508. The covariance computer 436 may arrange the spatial covariance values as a covariance matrix for subsequent operations. In various embodiments, some of which will be described below in further detail, the spatial covariance values may be directly approximated or constructed through successive operations including an estimation of ISI power across subcarriers for each antenna (or spatial channel) and/or estimation of an antenna correlation matrix.

The receiver 400 may receive a data communication signal including one or more data symbols, block 512. A data symbol may be a symbol having a payload communicating various information to the receiver 400. The mitigator 440 may receive the computed covariance values from the CV computer 436 and, in cooperation with the various components of the receiver 400, employ the computed spatial covariance values to mitigate ISI in the received data communication signal, block 516.

The ISIs from different antennas may have spatial correlations, which may be different from the independent identically distributed AWGN, n(f) in equation 1. The spatial correlation of ISI may be computed as follows. Since ISI may come from part of the previous (or next) symbol from each antenna (or spatial channel), the received ISI may be a linear combination of the partial symbols from all the antennas (or spatial channels). Dropping the subcarrier index f of EQ. 1 for simplicity, the received signal, with ISI modeled as correlated noise, may be $$y = H_d x + H_i z + n,\qquad [EQ\ 3]$$

where x and z are the desired and interfering signal vectors, respectively; $H_d$ and $H_i$ are channel matrices (or beamformed channel matrices) for the desired and ISI signals, respectively. Each entry of the z vector may be generated from part of the previous (or next) symbol from one antenna (or spatial channel) that causes the ISI. $H_d$ may vary across frequency while $H_i$ may be roughly the same. $H_d$ may be known at the receiver while $H_i$ may not be. $H_i$ may be caused by the last channel taps that exceed the cyclic prefix of the symbol. The tap may be complex Gaussian distributed.

The power level of ISI across a group of contingous subcarriers may be denoted as $p_z$ and it may be estimated from channel training signals. Some margin may be added to $p_z$ for robustness. For example, if the estimated pz is 0.01 milliwatts (mW), 0.02 mW may be used in a subsequent computation. $p_x$ may be the power of the transmitted signal per antenna (or spatial channel) and it may be different across antennas (or spatial channels).

$H_i$ may be modeled as $$H_i = R_{rx}^{1/2} H_{iid} R_{tx}^{1/2}, \quad [\text{EQ. 4}]$$

or $$vec(H_i) = (R_{tx}^{T/2} \otimes R_{rx}^{1/2}) vec(H_{iid}), \quad [\text{EQ. 5}]$$

where $H_{iid}$'s entries may be independent identically distributed (iid) and circularly symmetric complex Gaussian random variables with unit variance; $R_{rx}$ and $R_{tx}$ may be spatial correlation matrices for the receive and transmit antenna arrays, respectively. Because the two matrices may be assumed approximately the same across a group of contiguous subcarriers, they may be estimated from channel training signals. An efficient approximation may be to compute $R_{rx}$ and $R_{tx}$ only from the antenna correlation of two adjacent antennas on the receiver and transmitter, respectively They may be computed as $$R_{rx} = p_z \begin{bmatrix} 1 & \rho_r & \cdots & \rho_r^{N_r-1} \\ \rho_r & 1 & \rho_r & \rho_r^{N_r-2} \\ \vdots & \rho_r & \ddots & \vdots \\ \rho_r^{N_r-1} & \rho_r^{N_r-2} & \cdots & 1 \end{bmatrix}, \quad [\text{EQ. 6}]$$

and $$R_{tx} = p_z \begin{bmatrix} 1 & \rho_t & \cdots & \rho_t^{N_t-1} \\ \rho_t & 1 & \rho_t & \rho_t^{N_t-2} \\ \vdots & \rho_t & \ddots & \vdots \\ \rho_t^{N_t-1} & \rho_t^{N_t-2} & \cdots & 1 \end{bmatrix}, \quad [\text{EQ. 7}]$$

where $\rho_r$ and $\rho_t$ may be the correlation coefficients between two adjacent receive and transmit antennas, respectively; and $N_r$ and $N_t$ may be the numbers of receive and transmit antennas, respectively. The correlation coefficient may be defined as $$\rho_{X_1 X_2} = \frac{E[(X_1 - \mu_1)(X_2 - \mu_2)^*]}{\sigma_1 \sigma_2}, \quad [\text{EQ. 8}]$$

where $\rho_{X_1 X_2}$ may be the correlation coefficient between random variables $X_1$ and $X_2$; $\mu_1$ and $\mu_2$ may be the means of $X_1$ and $X_2$, respectively; $\sigma_1$ and $\sigma_2$ may be the standard deviations of $X_1$ and $X_2$, respectively; $\rho_{X_1 X_2}$ may be a number with norm less than or equal to one and have no power unit. The entry on the $m^{th}$ row and $n^{th}$ column of $R_{rx}$ may be the correlation between the $m^{th}$ and $n^{th}$ receive antennas defined as $$c_{m,n} = E[(\alpha_m - \mu_m)(\alpha_n - \mu_n)^*], \quad [\text{EQ. 9}]$$

where $\alpha_m$ and $\alpha_n$ may be the received signals at receive antennas m and n for a single common transmitted signal; $\mu_m$ and $\mu_n$ may be the means of $\alpha_m$ and $\alpha_n$, respectively; $c_{m,n}$ has the unit of power. For non line of sight channels, all the means $\mu_m$ s may be zero and the computation may be further simplified. $E(H_i H_i^H)$ may either be directly estimated, or $p_z$, $\rho_r$, and $\rho_t$ may be estimated and then $E(H_i H_i^H)$ may be approximated. Correlation between $H_i$ entries may be computed as $$E[vec(H_i) vec^H(H_i)] = E[(R_{tx}^{T/2} \otimes R_{rx}^{1/2})(R_{tx}^{T/2} \otimes R_{rx}^{1/2})^H] \quad [\text{EQ. 10}]$$
$$= E[(R_{tx}^{T/2} \otimes R_{rx}^{1/2})((R_{tx}^{1/2})^* \otimes R_{rx}^{H/2})]$$
$$= E[(R_{tx}^{T/2}(R_{tx}^{1/2})^*) \otimes (R_{rx}^{1/2} R_{rx}^{H/2})]$$
$$= E[R_{tx}^T \otimes R_{rx}]$$

(if $R_{rx}$ and $R_{tx}$ are Hermitian).

Define A as $$A = E[vec(H_i) vec^H(H_i)], \quad [\text{EQ. 11}]$$

then the covariance matrix $E(H_i H_i^H)$ may be computed as $$E[H_i H_i^H]_{m,n} = \sum_{k=1}^{N_t} a_{(k-1)N_r+m,(k-1)N_r+n}, \quad [\text{EQ. 12}]$$

where $a_{m,n}$ may be the entry of A on the $m^{th}$ row and $n^{th}$ column.

The receiver 108 may employ this covariance matrix, $E(H_i H_i^H)$, to conduct ISI mitigation on a received signal. The ISI mitigation may be conducted in a variety of ways depending on the particulars of a given embodiment such as the type of receiver algorithms being employed, e.g., MMSE filtering, successive interference cancellation, etc.

In an embodiment utilizing MMSE filtering, an MMSE filter for a received signal y may be computed as $$W = R_{xx} H_d^H (H_d R_{xx} H_d^H + H_i R_{zz} H_i^H + \sigma^2 I)^{-1} = p_x H_d^H (p_x H_d H_d^H + p_z H_i H_i^H + \sigma^2 I)^{-1}, \quad [13]$$

where $\sigma^2$ is the AWGN power of each entry of n. Because the instantaneous $H_i H_i^H$ may be unknown at the receiver 108, it may be replaced by the mean of $H_i H_i^H$ over a range of time and subcarriers, i.e., $E(H_i H_i^H)$, for the MMSE filtering. The received signal y may then be filtered as $\hat{x} = Wy$.

Figure 6:
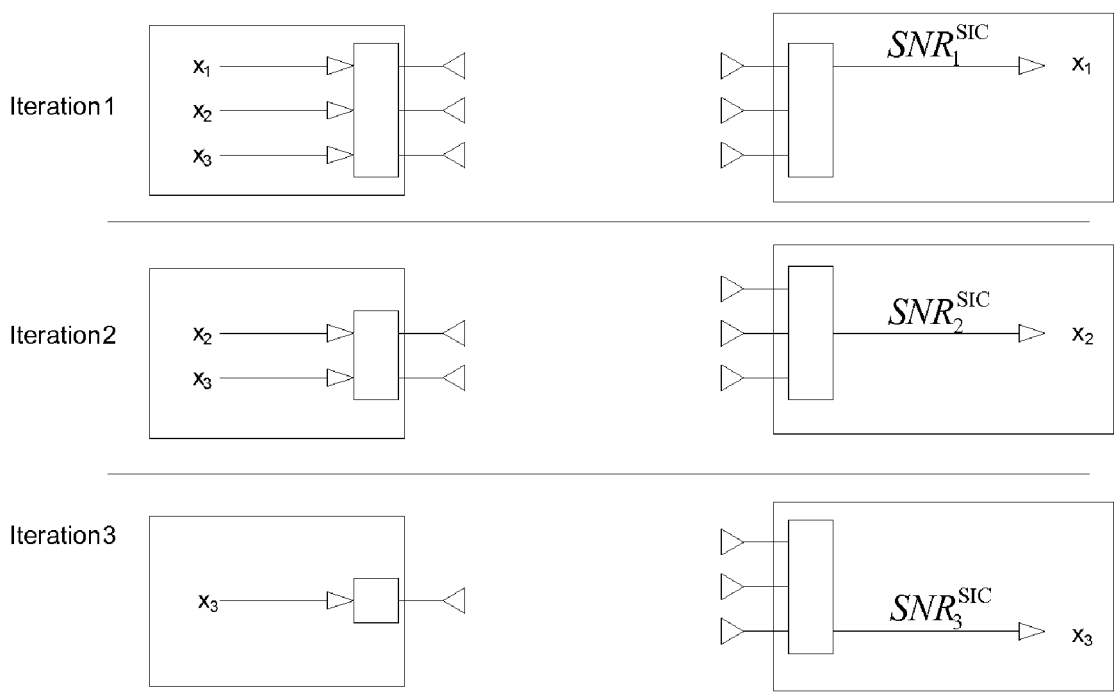
FIG. 6 illustrates ISI mitigation in a receiver employing successive interference cancellation in accordance with various embodiments of the present invention.

FIG. 6 illustrates a transmission upon which the receiver 108 employs SIC in accordance with various embodiments of the present invention. In this embodiment, the number of columns of the $H_d$ matrix may decrease with each successive iteration while $H_i$ remains constant. For example, as shown in FIG. 6, $H_d$ has three columns in the first iteration, The first column may be removed after the first data stream carried by $x_1$ is decoded and there may be two columns left in $H_d$ for the second iteration. $H_i$ may remain constant across iterations because ISI is not decoded and cancelled in SIC process.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method, comprising:
   receiving one or more training symbols over a plurality of subcarriers of a spatial channel;
   computing, with a covariance computer, based on at least in part on the received one or more training symbols, one or more spatial covariance values for intersymbol interference (ISI) over a predetermined time and over the plurality of subcarriers;
   receiving one or more data symbols; and
   employing the computed one or more spatial covariance values to conduct ISI mitigation on the received one or more data symbols.

2. The method of claim 1, where said computing of the one or more spatial covariance values for ISI comprises:
   estimating ISI power across the plurality of subcarriers of the spatial channel.

3. The method of claim 1, wherein said received one or more training symbols comprise one or more pilot and/or preamble symbols.

4. The method of claim 3, wherein the received one or more training symbols are represented by received signal y modeled by:

$$y = H_d x + H_i z + n,$$

where $H_d$ and $H_i$ are channel matrices for a transmitted signal and an interfering signal, respectively, x is a transmitted signal, z is an interfering signal, and n is noise.

5. The method of claim 4, wherein $H_d$ and $H_i$ are different.

6. The method of claim 4, wherein said computing of one or more spatial covariance values comprises computing a covariance matrix $E[H_i H_i^H]$ modeled by:

$$E[H_i H_i^H]_{m,n} = \sum_{k=1}^{N_t} a_{(k-1)N_r+m, (k-1)N_r+n},$$

where $a_{m,n}$ is an entry of A on $m^{th}$ row and $n^{th}$ column, where A is defined as $A = E[\text{vec}(H_i)\text{vec}^H(H_i)]$, $N_t$ is a number of transmit antennas, and $N_r$ is a number of receive antennas.

7. The method of claim 1, wherein said computing of the one or more spatial covariance values for ISI further comprises:
   estimating an antenna correlation matrix for one or more transmit antennas.

8. The method of claim 1, wherein said computing of the one or more spatial covariance values for ISI further comprises:
   estimating an antenna correlation matrix for one or more receive antennas.

9. An apparatus comprising:
   a covariance computer configured to receive one or more training symbols over a plurality of subcarriers of a spatial channel and to compute, based at least in part on the received one or more training symbols, one or more spatial covariance values for intersymbol interference (ISI) over a predetermined time and over the plurality of subcarriers; and
   a mitigator coupled to the covariance computer and configured to employ the computed one or more spatial covariance values to conduct ISI mitigation on one or more data symbols.

10. The apparatus of claim 9, where the covariance computer is further configured to:
    estimate ISI power across the plurality of subcarriers of the spatial channel; and
    compute the one or more spatial covariance values based at least in part on the estimated ISI power.

11. The apparatus of claim 9, wherein the one or more training symbols comprise one or more pilot and/or preamble symbols.

12. The apparatus of claim 9, wherein the covariance computer is further configured to model the received one or more training symbols as received signal y modeled by:

$$y = H_d x + H_i z + n,$$

where $H_d$ and $H_i$ are channel matrices for a transmitted signal and an interfering signal, respectively, x is a transmitted signal, z is an interfering signal, and n is noise.

13. The apparatus of claim 9, wherein the covariance computer is configured to compute the one or more spatial covariance values as a covariance matrix.

14. A machine-accessible medium having associated instructions, which, when accessed, results in a machine:
    receiving one or more training symbols over a plurality of subcarriers of a spatial channel;
    computing, based at least in part on the received one or more training symbols, one or more spatial covariance values for intersymbol interference (ISI) over a predetermined time and over the plurality of subcarriers;
    receiving one or more data symbols; and
    employing the computed one or more spatial covariance values to conduct ISI mitigation on the received one or more data symbols.

15. The machine-accessible medium of claim 14, wherein the instructions, when accessed, further results in the machine:
    estimating ISI power across the plurality of subcarriers of the spatial channel; and
    computing the one or more spatial covariance values for ISI based at least in part on said estimated ISI power.

16. The machine-accessible medium of claim 14, wherein said one or more training symbols comprise one or more pilot and/or preamble symbols.

17. The machine-accessible medium of claim 16, wherein said instructions, when accessed, further results in the machine:
    modeling the one or more training symbols as received signal y modeled as $$y = H_d x + H_i z + n,$$

where $H_d$ and $H_i$ are channel matrices for a transmitted signal and an interfering signal, respectively, x is a transmitted signal, z is an interfering signal, and n is noise.

18. The machine-accessible medium of claim 17, wherein $H_d$ and $H_i$ are different.

19. The machine-accessible medium of claim 14, wherein the instructions, when accessed, further results in the machine:
    computing the one or more spatial covariance values as a covariance matrix.

20. A system comprising:
    a plurality of receive antennas configured to receive one or more training symbols and one or more data symbols over a plurality of subcarriers of a spatial channel via an over-the-air communication (OTA) link; and an intersymbol interference (ISI) controller coupled to the plurality of receive antennas and configured to compute, based at least in part on the received one or more training symbols, one or more spatial covariance values for ISI over a predetermined time and over the plurality of subcarriers; and employ the computed one or more spatial covariance values to conduct ISI mitigation on the received one or more data symbols.

21. The system of claim 20, wherein the one or more training symbols comprise one or more pilot and/or preamble symbols.

22. The system of claim 20, wherein the ISI controller is further configured to model the one or more training symbols as received signal y modeled by:

$$y=H_d x+H_i z+n,$$

where $H_d$ and $H_i$ are channel matrices for a transmitted signal and an interfering signal, respectively, x is a transmitted signal, z is an interfering signal, and n is noise.

23. The system of claim 20, wherein the ISI controller is configured to compute the one or more spatial covariance values as a covariance matrix.

* * * * *

UNITED STATES PATENT AND TRADEMARK OFFICE
CERTIFICATE OF CORRECTION

PATENT NO. : 7,623,603 B2 Page 1 of 1
APPLICATION NO. : 11/539535
DATED : November 24, 2009
INVENTOR(S) : Li et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 666 days.

Signed and Sealed this

Twenty-sixth Day of October, 2010

David J. Kappos
*Director of the United States Patent and Trademark Office*